United States Patent
Tiwari et al.

(10) Patent No.: US 9,026,846 B2
(45) Date of Patent: May 5, 2015

(54) DATA RECOVERY IN A RAID CONTROLLER BY OFFLOADING CONTENTS OF DRAM TO A FLASH MODULE ON AN SAS SWITCH

(71) Applicant: LSI Corporation, San Jose, CA (US)

(72) Inventors: Prafull Tiwari, Bangalore (IN); Madan Mohan Munireddy, Bangalore (IN)

(73) Assignee: LSI Corporation, Milpitas, CA (US)

( * ) Notice: Subject to any disclaimer, the term of this patent is extended or adjusted under 35 U.S.C. 154(b) by 167 days.

(21) Appl. No.: 13/886,333

(22) Filed: May 3, 2013

(65) Prior Publication Data

US 2014/0281688 A1    Sep. 18, 2014

(30) Foreign Application Priority Data

Mar. 15, 2013 (IN) .......................... 1136/CHE/2013

(51) Int. Cl.
| G06F 11/00 | (2006.01) |
| G06F 11/20 | (2006.01) |
| G06F 11/16 | (2006.01) |
| G06F 12/12 | (2006.01) |

(52) U.S. Cl.
CPC ........ *G06F 11/2069* (2013.01); *G06F 11/1662* (2013.01); *G06F 12/126* (2013.01)

(58) Field of Classification Search
None
See application file for complete search history.

(56) References Cited

U.S. PATENT DOCUMENTS

| 5,448,719 | A  * | 9/1995  | Schultz et al.   | 714/5.11 |
| 5,524,203 | A  * | 6/1996  | Abe              | 714/6.1  |
| 5,787,242 | A  * | 7/1998  | DeKoning et al.  | 714/5.11 |
| 2003/0070041 | A1 * | 4/2003 | Beardsley et al. | 711/113 |
| 2005/0120267 | A1 * | 6/2005 | Burton et al.    | 714/13  |
| 2006/0069870 | A1 * | 3/2006 | Nicholson et al. | 711/118 |
| 2009/0300298 | A1 * | 12/2009 | Ash et al.      | 711/156 |
| 2010/0042783 | A1 * | 2/2010 | Schwarz et al.   | 711/118 |
| 2011/0016271 | A1 * | 1/2011 | Ash et al.       | 711/113 |
| 2013/0097456 | A1 * | 4/2013 | Drucker et al.   | 714/4.11 |

* cited by examiner

*Primary Examiner* — Gabriel Chu
(74) *Attorney, Agent, or Firm* — Duft Bornsen & Fettig LLP

(57) ABSTRACT

Disclosed is a system and method for providing data integrity for pinned cache even if a RAID controller card fails while it has pinned cache or a memory module goes bad. A controller is enabled to use complete cache lines even if pinned cache is present, thereby enabling other virtual disks to run in write-back mode when pinned cache is present.

18 Claims, 5 Drawing Sheets

DATA RECOVERY IN A RAID CONTROLLER BY OFFLOADING CONTENTS OF DRAM TO A FLASH MODULE ON AN SAS SWITCH

FIELD OF THE INVENTION

The field of the invention relates generally to cache performance with pinned cache presence in controller DRAM.

BACKGROUND

RAID users can generally configure a virtual disk in either write back or write through policy. Write through policy guarantees data integrity. Write back cache policy provides superior I/O throughput.

A RAID controller card may have a battery or a Supercap solution for disk failures. A battery/supercap solution can hold data (pinned cache) present in memory for a certain time period when a server does not have a power supply. When pinned cache data is present, cache lines are used to store pinned Cache and all other online virtual disks will operate in write through mode until either pinned cache is discarded or missing virtual disks are imported back to recover pinned cache through flushing.

SUMMARY

An embodiment of the present invention may comprise a method of recovering data in a RAID system, the method comprising: determining if a pin cache has been generated in a controller DRAM due to a virtual disk failure; offloading the controller DRAM pin cache contents to a flash module on an SAS switch in the RAID controller; replacing the failed virtual disk with a new disk; and flushing the pinned cache data from the flash module in the SAS switch to the new disk.

An embodiment of the present invention may further comprise a system for recovering data in a RAID system, the system comprising: a RAID controller comprising an SAS switch, the SAS switch comprising a flash module; and at least one server connected to the SAS switch; wherein: if the at least one server fails, the server is enabled to generate pin cache for its data contents in the Controller DRAM; the SAS switch is enabled to store pin cache data from the failed server to the flash module; and the SAS switch is enabled to flush the pin cache data to a new server.

DETAILED DESCRIPTION OF THE EMBODIMENTS

Serial Attached SCSI (SAS) is a point-to-point serial protocol that is used to move data to and from computer storage devices such as hard drives and tape drives. An SAS domain is the SAS version of a SCSI domain—it consists of a set of SAS devices that communicate with one another through a service delivery subsystem. Each SAS port in a SAS domain has a SCSI port identifier that identifies the port uniquely within the SAS domain. It is assigned by the device manufacturer, like an Ethernet device's MAC address, and is typically world-wide unique as well. SAS devices use these port identifiers to address communications to each other. In addition, every SAS device has a SCSI device name, which identifies the SAS device uniquely in the world. One doesn't often see these device names because the port identifiers tend to identify the device sufficiently.

Electrical double-layer capacitors (EDLC) are, together with pseudocapacitors, part of a type of electrochemical capacitors called supercapacitors, also known as ultracapacitors. For purposes of simplicity, the term supercapacitor or supercap will be used throughout this description to encompass the category described above. Supercapacitors do not have a conventional solid dielectric.

Typically, RAID controller cards have a battery or supercap solution to maintain data integrity if a power failure occurs. A battery or a supercap can hold data present in memory for a certain period of time when the server has its supply interrupted. This held data is termed pinned cache. It is understood that the battery or supercap may discharge before the power supply is re-established. It is also understood that controller card which has the pinned data may itself suffer some sort of failure. A memory module may also fail resulting in memory that is not transportable. Data loss may occur.

In an embodiment of the invention, data integrity is provided for pinned cache even if a RAID controller card fails while it has pinned cache or a memory module goes bad. A controller is enabled to use complete cache lines even if pinned cache is present, thereby enabling other virtual disks to run in write-back mode when pinned cache is present.

When pinned cache data is present, performance is affected as cache lines are used to store pinned cache and all other online virtual disks must operate in write-through mode until either pin cache is discarded or missing virtual disks are imported back to recover pinned cache through flushing. The ability for a user to initiate background operations may also be affected when pinned cache is present.

Figure 1:
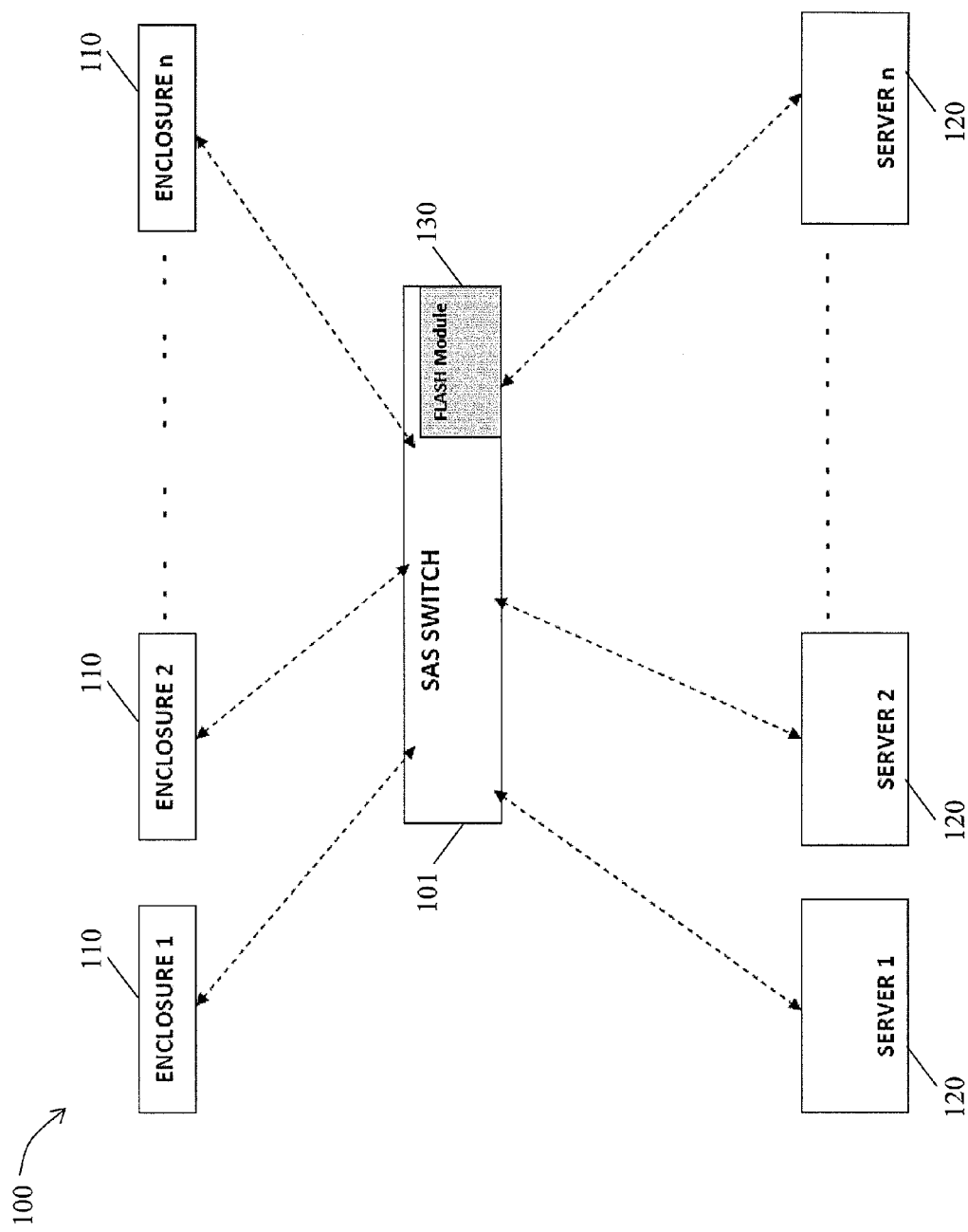
FIG. 1 shows a diagram of an SAS switch (with an integrated flash module) connected to multiple servers and multiple enclosures.

FIG. 1 shows a diagram of an SAS switch (with an integrated flash module) connected to multiple servers and multiple enclosures. In the system 100, the SAS switch 101 has an integrated flash module 130. A plurality of servers 120 connect to the SAS switch 101. Also, a plurality of enclosures 110 connect to the SAS switch. It is understood that the servers 120 may be RAID controller cards, or virtual disks, with the capability to generate a pin cache in DRAM.

Figure 2:
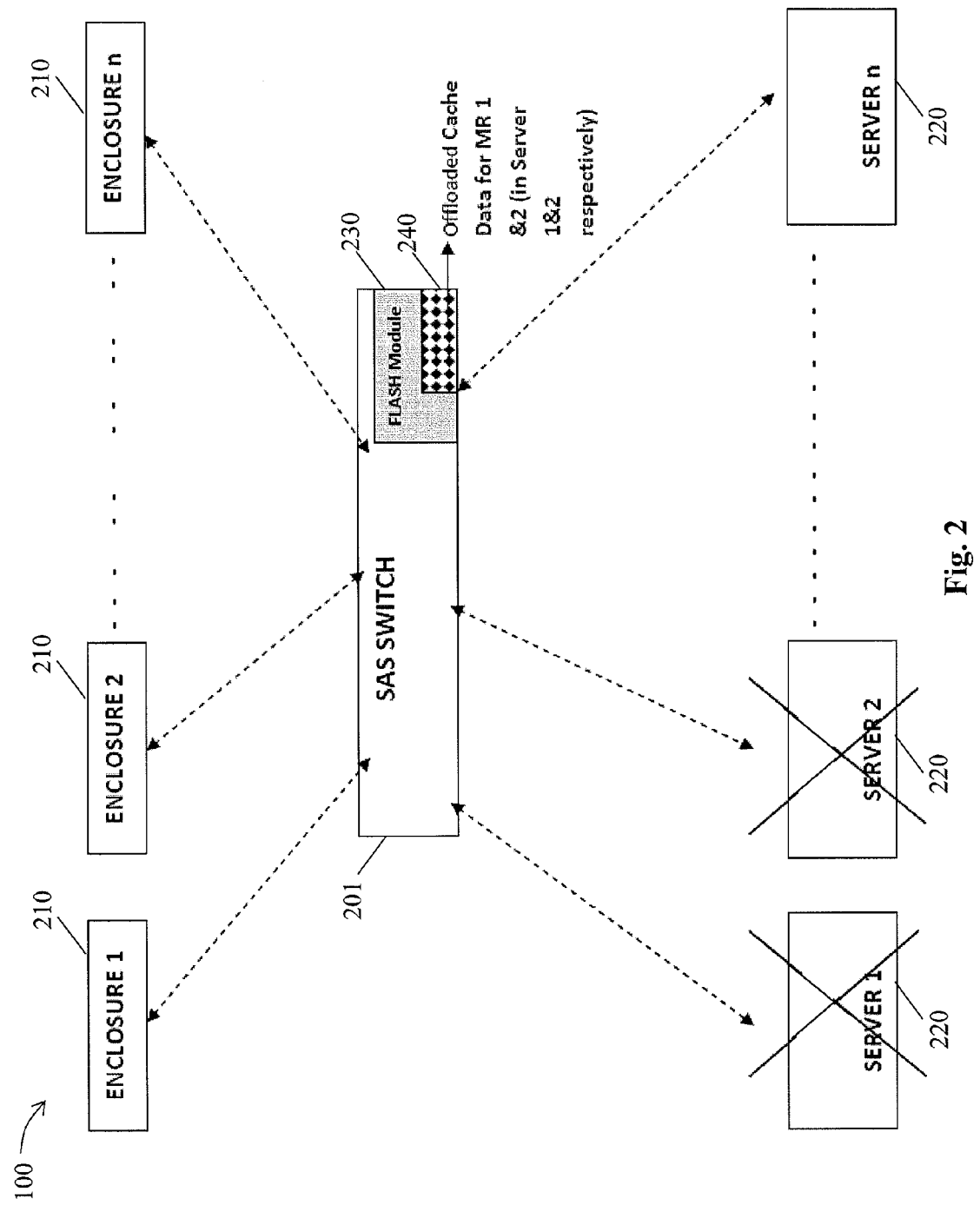
FIG. 2 is a diagram of an SAS switch connected with multiple servers with server failures.

FIG. 2 is a diagram of an SAS switch connected with multiple servers with server failures. The SAS switch 201 comprises an integrated flash module 230. A plurality of enclosures 210 connect to the SAS switch 201. As shown, two of the servers 220, server 1 and server 2, among the plurality of servers 220, have failed. The pinned cache data data from failed server 1 and server 2 is shown as offloaded cache data 240 in the flash module 230. It is understood that the failed servers 220 are in the same domain as the SAS switch. It is also understood that the servers 220 may be RAID controller cards, or virtual disks, with the capability to generate a pin cache in DRAM.

Figure 3:
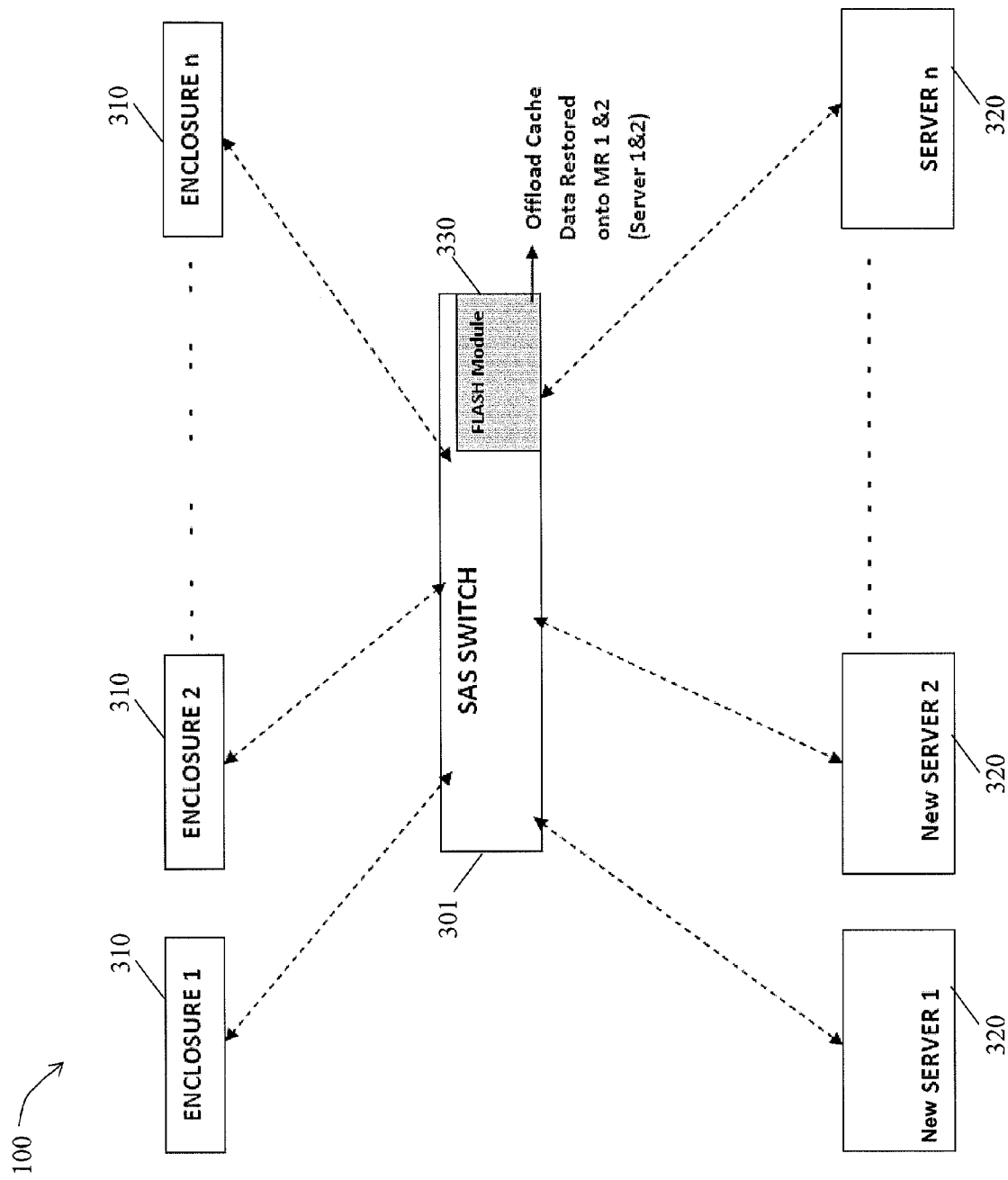
FIG. 3 is a diagram of an SAS switch connected to multiple servers with failed servers replaced.

FIG. 3 is a diagram of an SAS switch connected to multiple servers with failed servers replaced. The SAS switch 301 comprises an integrated flash module 330. A plurality of enclosures 210 connect to the SAS switch 301. The two failed servers from FIG. 2 have been replaced with a new server 1 and a new server 2 respectively in the plurality of servers 320. The portion of data which was offloaded cache 240 in FIG. 2 is restored to new server 1 and new server 2. It is understood that the servers 320 may be RAID controller cards, or virtual disks, with the capability to generate a pin cache in DRAM.

In an embodiment of the invention, firmware will offload in cache contents onto a flash module and flush the pinned cache from the flash module back to new controller or recovered virtual disks. However, initially, it must be determined whether the SAS switch has a flash module built into it. If the flash module does not exist in the SAS switch, then a legacy algorithm will be used to handle pinned cache contents. If a flash module is present in the SAS switch, it is determined whether a pin cache has been generated in the Controller DRAM due to a virtual disk failure.

However, if a virtual disk has failed and a pin cache has indeed been generated, then firmware will offload the controller DRAM pin cache contents to the FLASH module which is present on the SAS switch in the same SAS domain. A table in non-volatile RAM may be maintained. The non-volatile RAM table can be updated to indicate the presence of a pin cache for a missing, or failed, virtual disk. Next it must be determined if the servers have been recovered, or replaced, and a new server is available to the SAS switch. Once the new server is available to the SAS switch, and controller, the pinned cache from the flash module in the SAS switch is flushed to the new server. Essentially, the data is recovered to the new virtual disk, new server. It is understood that the servers may be RAID controller cards, or virtual disks, with the capability to generate a pin cache in DRAM.

Once it is determined that the pinned cache recovery is successful, the non-volatile RAM table can be cleared of the entry for the virtual disk that had the pinned cache recovered. If the pinned cache recovery is not successful, a failure notification may be sent to a user or administrator. The method and system may re-initialize for a subsequent virtual disk failure.

Figure 4:
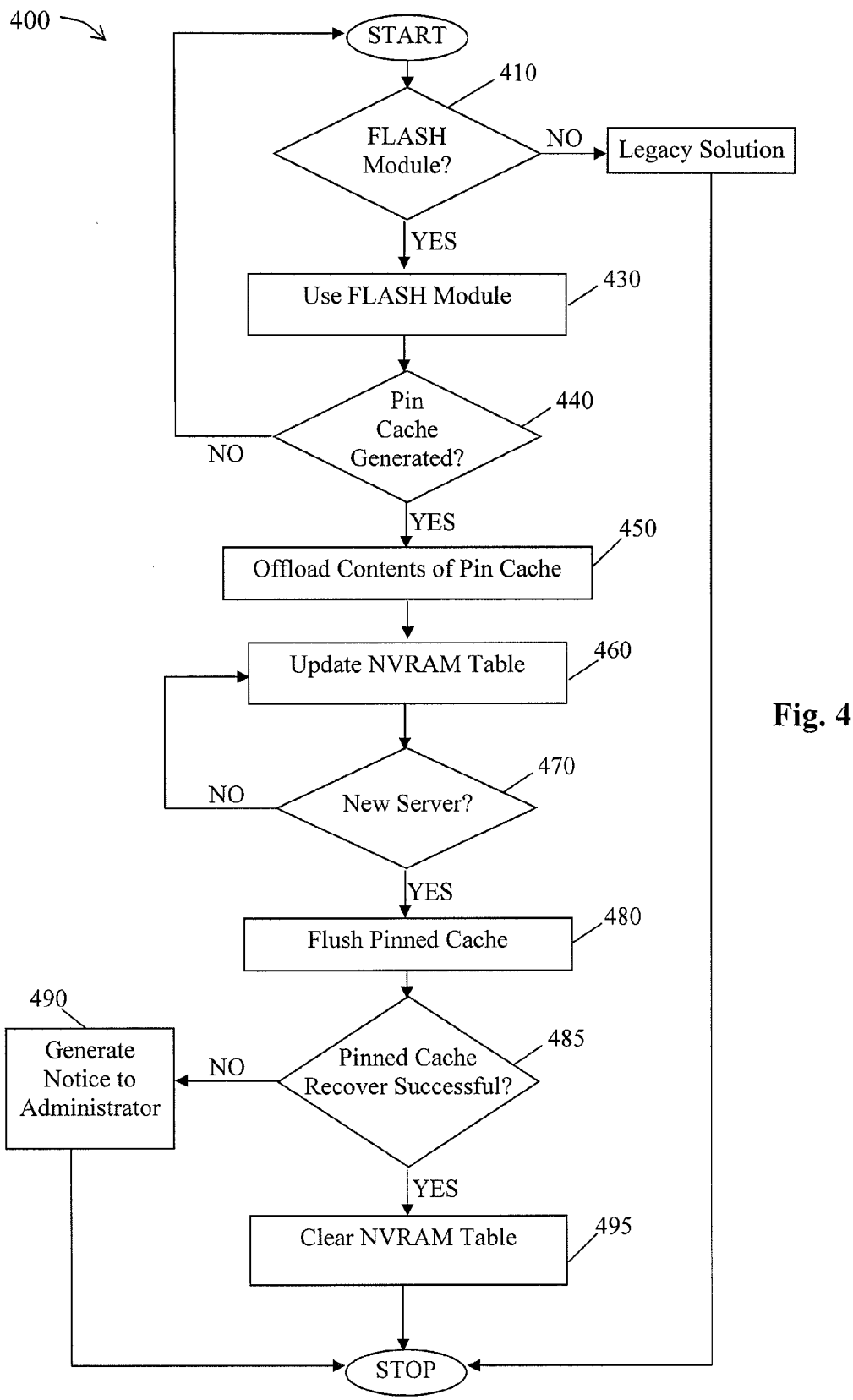
FIG. 4 is a flow diagram of an algorithm to provide cache performance with pinned cache presence in the controller.

FIG. 4 is a flow diagram of an algorithm to provide cache performance with pinned cache presence in the controller. In the algorithm 400, first it is determined at step 410 whether the SAS switch in the storage domain has a flash module built into it. If no flash module is present in the SAS switch, at step 420 a legacy firmware solution will handle the pin cache of a failed virtual disk. This may be a battery or supercap solution as described above. If a flash module is present, then it will be determined, at step 430, to use the flash module for pinned cache recovery. At step 440. It is determined whether a virtual disk has failed and whether a pin cache has been generated in a control DRAM. If not, then there is no need for pinned cache recovery and the process can reinitialize. If a pin cache has been generated in a failed virtual disk, then, at step 450, firmware will offload the controller DRAM pin cache contents to the flash module. As noted above, the flash module is present on the SAS switch. Further, SAS switch with the flash module may be in the same domain as the failed virtual disk.

At step 460 of FIG. 4, a non-volatile memory table may be updated. The NVRAM is updated to indicate the presence of pin cache, and pin cache data, for a missing, or failed, virtual disk. At step 470, it is determined if the failed server has been recovered, or replaced. The new server will be available to the SAS switch. If the new server is not available, then the NVRAM table data is maintained. If the new server is available, then the pinned cache from the flash module is flushed to the new server at step 480. This effectively recovers the pinned data from the original failed server, or virtual disk. If the recovery is successful, step 485, then the NVRAM table entry for the failed virtual disk with the pinned cache data is cleared at step 495. If the recovery is not successful, an error notice is generated to an administrator at step 490. It is understood that the servers may be RAID controller cards, or virtual disks, with the capability to generate a pin cache in DRAM.

Figure 5:
FIG. 5 is a table showing memory layout on a flash module for storing offloaded cache from multiple servers with multiple controllers.

FIG. 5 is a table showing memory layout on a flash module for storing offloaded cache from multiple servers with multiple controllers. It is understood that different layouts of the flash module may be used to accomplish pin cache offloads to the flash. The layout 500 shows a plurality of server ids 510 from 1 to n. Within each server, and server id 510, there may be a number of RAID controllers 520. Within each RAID controller 520, there may be a plurality of virtual disks configured on the controller 530. Each virtual disk may receive a virtual disk ID 540. For each virtual disk, there may be an indicator for whether a cache offload onto flash memory in the SAS switch has occurred 550. If there has been a cache offload onto the flash memory in the SAS switch, a starting LBA of the offloaded cache is identified 560. The end LBA of the offloaded cache is also identified 570. It is understood that a Logical block addressing (LBA) is a common scheme used for specifying the location of blocks of data stored on computer storage devices, generally secondary storage systems such as hard disks. LBA is a particularly simple linear addressing scheme. Blocks are located by an integer index, with the first block being LBA 0, the second LBA 1, and so on.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of recovering data in a RAID system, said method comprising:
   determining if a pin cache has been generated in a controller DRAM due to a virtual disk failure;
   offloading said controller DRAM pin cache contents to a flash module on an SAS switch;
   replacing said failed virtual disk with a new disk; and
   flushing said pin cache contents from said flash module in said SAS switch to the new disk.

2. The method of claim 1, said method further comprising establishing a nonvolatile RAM table, said table comprising information about pin cache data for the failed virtual disk.

3. The method of claim 2, wherein said information comprises cache offload to said flash module status, starting LBA of offloaded cache and ending LBA of offloaded cache.

4. The method of claim 1, wherein said process of offloading said controller DRAM pin cache contents comprises offloading said controller DRAM pin cache contents to a flash module on an SAS switch in the same domain as said failed virtual disk.

5. The method of claim 1, said method further comprising determining if said SAS switch comprises a flash module.

6. The method of claim 5, said method further comprising establishing a table, said table comprising information about pin cache data for the failed virtual disk.

7. The method of claim 6, wherein said information comprises cache offload to said flash module status, starting LBA of offloaded cache and ending LBA of offloaded cache.

8. A system for recovering data in a RAID system, said system comprising:
- a RAID controller connected to an SAS switch, said SAS switch comprising a flash module; and
- at least one server connected to said SAS switch;
- wherein:
  - if said at least one server fails, said server is enabled to generate pin cache for its data contents in DRAM of the controller;
  - said SAS switch is enabled to store pin cache data from said failed server to said flash module; and
  - said SAS switch is enabled to flush said pin cache data to a new server.

9. The system of claim 8, said system further comprising a non-volatile RAM table, said table comprising information about pin cache data for the failed server.

10. The system of claim 9, wherein said information comprises cache offload to said flash module status, starting LBA of offloaded cache and ending LBA of offloaded cache.

11. The system of claim 8, wherein said at least one server connected to said SAS switch comprises an electrochemical capacitor.

12. A Serial Attached Small Computer System Interface (SAS) domain, the SAS domain comprising:
- a Redundant Array of Independent Disks (RAID) controller comprising a Dynamic Random Access Memory (DRAM);
- a SAS switch communicatively coupled to the RAID controller and comprising a flash module; and
- a first server communicatively coupled to the SAS switch, wherein the RAID controller, upon a virtual disk failure, is operable to generate a pin cache in the DRAM for caching data of the first server, to detect the flash module of the SAS switch, to offload the data of the pin cache to the flash module, to detect a new server as a replacement to the first server, and to flush the data of the pin cache residing in the flash module to a DRAM of the new server.

13. The SAS domain of claim 12, further comprising:
- a table implemented in non-volatile DRAM and operable to track a location of the data of the pin cache in the flash module, wherein a successful flush of the data of the pin cache from the flash module clears the location from the table.

14. A method of recovering data in a Serial Attached Small Computer System Interface (SAS) domain, the method comprising:
- detecting a failure by a virtual disk being implemented at least in part by a first server in the SAS domain;
- generating a pin cache in Dynamic Random Access Memory (DRAM) of a Redundant Array of Independent Disks (RAID) controller;
- storing data of the failed virtual disk in the pin cache;
- detecting a flash module of a SAS switch communicatively coupled to the RAID controller and the first server;
- offloading the data to the flash module of the SAS switch;
- detecting a second server as a replacement to the first server; and
- flushing the data of the pin cache residing in the flash module to a DRAM of the second server.

15. The method of claim 14, further comprising:
- tracking a location of the data of the pin cache with a non-volatile DRAM (NVDRAM) table.

16. The method of claim 15, further comprising:
- clearing the location of the data of the pin cache from the NVDRAM table upon a successful flush of the data from the flash module to the DRAM of the second server.

17. The method of claim 14, further comprising:
reestablishing the virtual disk via the second server.

18. The method of claim 17, further comprising:
- implementing a RAID storage management on the virtual disk.

* * * * *